US007394760B1

(12) United States Patent
Nucci et al.

(10) Patent No.: US 7,394,760 B1
(45) Date of Patent: Jul. 1, 2008

(54) METHOD AND SYSTEM FOR CORRELATING PRACTICAL CONSTRAINTS IN A NETWORK

(75) Inventors: Antonio Nucci, Burlingame, CA (US);
Nina A. Taft, San Francisco, CA (US);
Christophe Diot, Cambridge (GB);
Frederic Giroire, Paris (FR)

(73) Assignee: Sprint Communications Company L.P., Overland Park, KS (US)

( * ) Notice: Subject to any disclaimer, the term of this patent is extended or adjusted under 35 U.S.C. 154(b) by 904 days.

(21) Appl. No.: 10/615,649

(22) Filed: Jul. 9, 2003

(51) Int. Cl.
*H04L 12/28* (2006.01)
(52) U.S. Cl. .................... 370/225; 370/238
(58) Field of Classification Search ............. 370/225, 370/238
See application file for complete search history.

(56) References Cited

U.S. PATENT DOCUMENTS

| | | | | |
|---|---|---|---|---|
| 5,164,938 A * | 11/1992 | Jurkevich et al. | ........... | 370/231 |
| 5,500,808 A * | 3/1996 | Wang | ........................... | 703/19 |
| 5,590,356 A * | 12/1996 | Gilbert | ........................ | 712/31 |
| 5,600,638 A * | 2/1997 | Bertin et al. | ................. | 370/351 |
| 5,764,740 A * | 6/1998 | Holender | ............... | 379/112.05 |
| 5,805,578 A * | 9/1998 | Stirpe et al. | ................... | 370/255 |
| 5,933,607 A * | 8/1999 | Tate et al. | .............. | 370/395.61 |
| 6,069,894 A * | 5/2000 | Holender et al. | ............ | 370/397 |
| 6,577,601 B1* | 6/2003 | Wolpert | ....................... | 370/238 |
| 6,956,824 B2 * | 10/2005 | Mark et al. | .................. | 370/242 |
| 2002/0097671 A1* | 7/2002 | Doverspike et al. | ......... | 370/216 |

FOREIGN PATENT DOCUMENTS

EP 950966 * 9/1989

OTHER PUBLICATIONS

Modiano et al, "Survicable routing of logical topologies in WDM networks", IEEE INFOCOM 2001, pp. 348-357.*
Nucci et al, "Design of Fault-Tolerant Logical Topologies in Wavelength-Routed Optical IP Networks", GLOBECOM 2001, pp. 1-6.*
T. Erlebach, K. Jansen, C. Kakalamanis, M. Mihail and P. Perslano "Optimal wavelength routing on directed fiber trees", Theoretical Computer Science, vol. 221, n.1-2, pp. 119-137, 1999.
D. S. Hochbaum editor "Approximation Algorithms for NP-Hard Problems", PWS Publishing Company, 1997.
Eric J. Harder, Sang-Kyu Lee and Hyeong-Ah Choi "On Wavelength Assignment in WDM Optical Networks", Proceedings of the 4th International Conference on Massively Parallel Processing Using Optical Interconnections (MPPOI'97), 1997.
A. Nucci, N. Taft, P. Tmran, H. Zang and C. Diot "Increasing the Link Utilization in IP over WDM Networks" Opticom 2002. Jun. 2002.

(Continued)

*Primary Examiner*—Kwang B. Yao
*Assistant Examiner*—Andrew Lai

(57) ABSTRACT

A system and method for identifying optimal mapping of logical links to the physical topology of a network is provided. Upon obtaining one or more mapping options for mapping multiple logical links between one or more pairs of network nodes onto physical paths that are at least relatively disjoint and obtaining a maximum time delay allowed between the each pair of network nodes, the mapping options are correlated with the maximum time delay to identify optimal mapping of logical links to the physical topology of a network.

28 Claims, 7 Drawing Sheets

CASE 2

OTHER PUBLICATIONS

G. Iannaccone, C. Chuah, R. Mortier, S. Bhattacharyya and C. Diot "Analysis of Link Failures in a Large IP Backbone" in Proc. 2nd ACM Sigcomm Internet Measurement Workshop (IMW), Nov. 2002.

K. Papagiannaki, S. Moon, C. Fraleigh, P. Thiran, F. Tobagi and C. Diot "Analysis of Measured Single-Hop Delay from an Operational Backbone Network" in Proc.IEEE Infocom, New York, Jun. 2002.

J. Armitage, O. Crochat, J. Y. Le Boudec "Design of a Survivable WDM Photonic Network", in Proc. INFOCOM '97, pp. 244-252, Apr. 1997.

O. Crochat, J.Y.Le Boudec "Design Protection for WDM Optical Networks", IEEE Journal on Selected Areas in Communication, vol. 16, n.7, pp. 1158-1165, Sep. 1998.

O.Crochat, J.Y.Le Boudec, O.Gerstel "Protection Interoperability for WDM Optical Networks", IEEE Transaction on Networking, vol. 8, n.3, pp. 384-395, Jun. 2000.

E. Modiano, A. Narula-Tam "Survivable routing of logical topologies in WDM networks", in Proc. INFOCOM '01 vol.1, pp. 348-357, Anchorage, Alaska, Apr. 2001.

F. Glover, E. Taillard and D. De Werra "A User's Guide to Tabu Search", Annals of Operations Research, vol. 41, pp. 3-28, 1993.

V. Kumar "Approximating arc circular colouring and bandwidth allocation in all-optical ring networks", First international Workshop on Approximation ALgorihms for Combinatorial Optimization Problems (APPROX'98), 1998.

A. Nucci, B. Sanso, T. G. Crainic, E. Leonardi, M. Marsan "Design of Fault-Tolerant Logical Topologies in Wavelength-Routed Optical IP Networks", IEEE Globecom Proceedings, Nov. 2001.

B. Beauquier, J-C. Bermond, L. Gargano, P. Hell, S. Perennes and U. Vaccar "Graph problems arising from wavelength-routing in all-optical networks", 2nd IEEE Workshop on Optics and Computer Science, part of IPP'97, Genova, Switzerland, Apr. 1997. IEEE Press.

V. Auletta, 1. Caragiannis and P. Persiano "Randomized path coloring on binary trees", 3rd International Workshop on Approximation ALgorihms for Combinatorial Optimization Problems (APPROX'OO), vol. I913, pp. 60-71, Springer-Verlag, 2000.

* cited by examiner

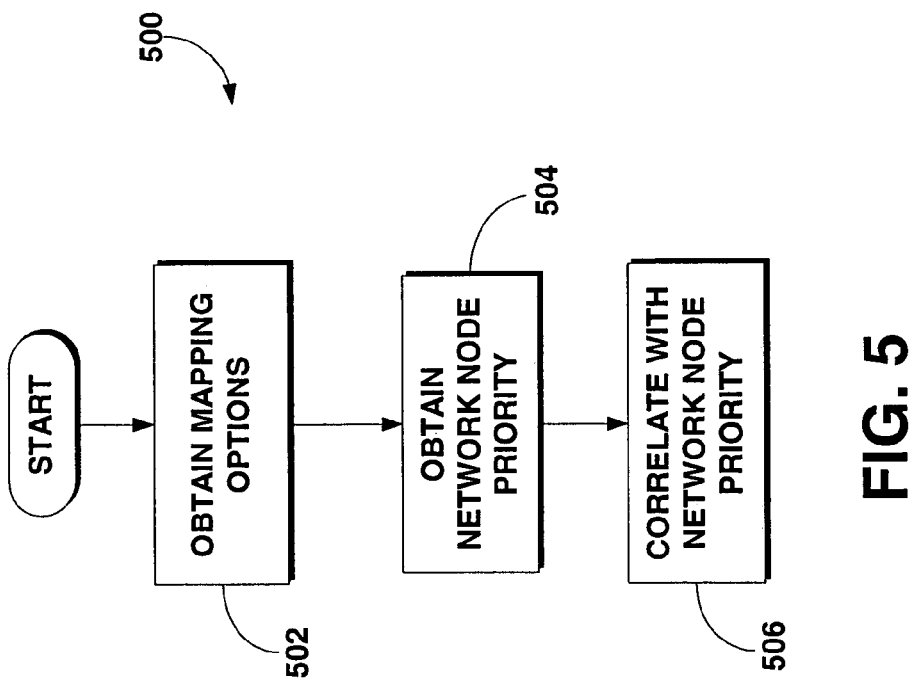
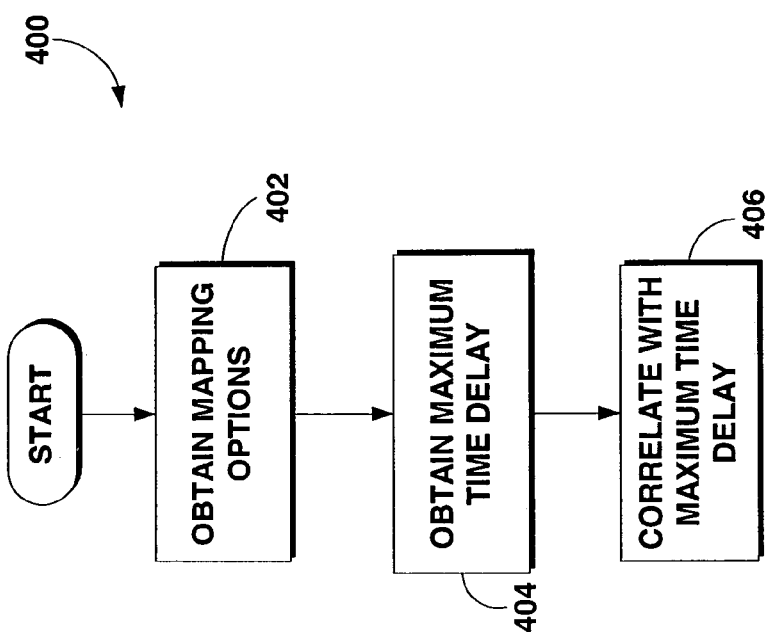

METHOD AND SYSTEM FOR CORRELATING PRACTICAL CONSTRAINTS IN A NETWORK

CROSS-REFERENCE TO RELATED APPLICATIONS

Not Applicable.

STATEMENT REGARDING FEDERALLY SPONSORED RESEARCH OR DEVELOPMENT

Not Applicable.

TECHNICAL FIELD

More particularly, the invention relates to a computerized system and method for identifying optimal mapping in a network. The system and method of the present invention increases the robustness of network backbones while taking into account practical considerations.

BACKGROUND OF THE INVENTION

Most Internet Protocol (IP) backbone networks are designed on top of a Dense Wavelength Division Multiplexing (DWDM) infrastructure. An IP network is a set of logical links that are statically mapped on the physical links of the fiber network. In a DWDM network, each logical link is assigned one wavelength if wavelength continuity is required, or a sequence of wavelengths if wavelength conversion equipment is present. Further, Internet Service Providers (ISPs) are systematically forced to use the shortest distance path between two Points of Presence (PoPs) in order to meet their promised Service Level Agreements (SLAs). In this environment, several logical links (each using a different wavelength) may traverse the same fiber (or the same conduit), making the IP network vulnerable to a physical link failure, such as a fiber cut, that can bring down a significant fraction of the IP routes.

In the past, a Synchronous Optical network (SONET) was used to offer protection and fast restoration of service. However, due to the cost of optical equipment, most ISPs do not use SONET protection anymore. Instead, they rely on the IP layer to restore the connectivity in case of failure. When equipment fails in the topical network, IP routers detect the failure and update their routing tables with alternate logical links. This approach only succeeds if the remaining set of logical links still forms a connected topology.

Mapping logical links to the physical topology to assure connectivity during failures has already been studied. Prior approaches include an Integer Linear Problem (ILP) formulation that solves the problem for moderate size networks by applying a Branch & Cut algorithm. However, this approach assumes there is only a single logical link between network node pairs and does not take into account any delay constraints.

Topology mapping with wavelength constraints has also been studied. Without wavelength converters, the problem is known as the wavelengths assignment problem (WAP). This problem is similar to the path-coloring problem in standard graphs, which is equivalent to the general vertex-coloring problem. Numerous heuristics have been proposed for different types of topologies. However, these approaches do not balance the tradeoff between running time and quality of the solution.

Accordingly, there remains a need for a system and method for identifying optimal mapping of logical links to the physical topology of a network that incorporates practical considerations, such as delay constraints, wavelength availability and multiple logical links between network node pairs.

BRIEF SUMMARY OF THE INVENTION

In one aspect of the present invention, a method for identifying optimal mapping of logical links to the physical topology of a network is provided. The method obtains one or more mapping options for mapping multiple logical links between one or more pairs of network nodes onto physical paths that are at least relatively disjoint. The method also obtains a maximum time delay allowed between the each pair of network nodes. The method correlates the mapping options with the maximum time delay. Optionally, the method also obtains a relative time delay allowed between two or more physical paths, the wavelength availability in the network and/or a priority order of the network node pairs. If so, the method correlates mapping options with the maximum time delay, the relative time delay, the wavelength availability and/or the network node priority pairs.

In yet another aspect of the present invention, a computer system for identifying optimal mapping of logical links onto the physical topology of a network is provided. The system includes a practical constraint module and a correlation module. The practical constraint module includes a mapping option sub-module for obtaining one or more mapping options for multiple logical links between one or more pairs of network nodes onto physical paths that are at least relatively disjoint and a maximum time delay sub-module for obtaining a maximum time delay allowed between the each pair of network nodes. The correlation module is coupled with the practical constraint module and correlates the mapping options with the maximum time delay.

Still a further aspect of the present invention is a system for identifying optimal mapping of logical links to the physical topology of a network. The system includes means for obtaining one or more mapping options for mapping multiple logical links between one or more pairs of network nodes onto physical paths that are at least relatively disjoint. The system also includes means for obtaining a maximum time delay allowed between the each pair of network nodes and means for correlating the mapping options with the maximum time delay to identify optimal mapping of logical links to the physical topology of a network.

BRIEF DESCRIPTION OF THE SEVERAL VIEWS OF THE DRAWING

FIG. 4 is a flowchart representative of a computer program for identifying optimal mapping in an IP network in accordance with an embodiment of the present invention.

FIG. 5 is a flowchart representative of a computer program for identifying optimal mapping in an IP network in accordance with an embodiment of the present invention;

DETAILED DESCRIPTION OF THE INVENTION

Figure 1:
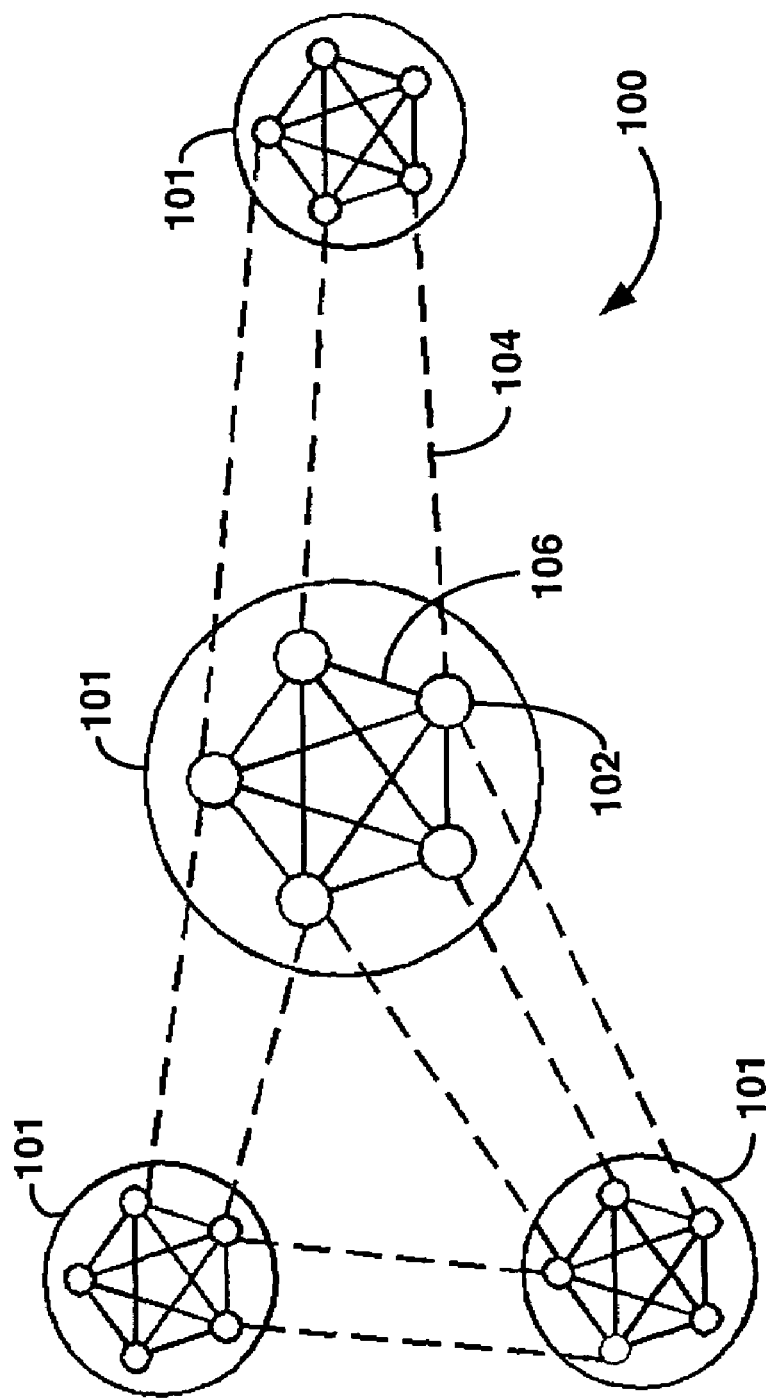
FIG. 1 is diagram of two mapping options between two neighboring network nodes.

With reference to FIG. 1, a network is made up of a set of network nodes (100) interconnected by logical links (104). Network nodes, may be, but are not limited to points of presence (PoPS). Each network node (101) is a mini-network composed of a small number of core routers (102), a large number of conventional access routers and intra-network node logical links (106). The core routers (102) in each network node (101) are fully meshed. In a large IP network, each access router is attached to a minimum of two core routers (102). Customers connect to conventional access routers. The connection between adjacent network nodes is done by parallel logical links terminating at different core routers in each network node in such a way that a single router failure cannot bring down a customer nor the entire connectivity between a pair of neighboring network nodes. The inter-network node links are connected by high capacity links (currently, 2.5 Gbps and 10 Gbps). Inter-network node links (and intra-network node logical links) are mapped onto the physical fiber topology.

In order to maximize fault-resilience of the network, parallel logical links may be mapped onto the fiber network in such a way that either a fiber (or conduit) or an optical equipment failure does not cause all the parallel logical links between a pair of network nodes to go down simultaneously. Neighboring (or adjacent) network nodes are network nodes that are directly connected by one or more logical links. There are typically several logical links between neighboring network nodes. The number of parallel logical links is different for each network node pair. The number of logical links may vary depending on the network design options adopted (currently between two and twelve). Each logical link is mapped to a physical fiber path (or physical link). Parallel logical links are mapped onto physical links that are at least relatively disjoint. This design approach improves the robustness of the backbone in the event of resource failure (e.g. router, optical device, fiber).

In addition, load balancing in large networks may be used on the parallel logical links in order to minimize the load of each link and improve the performance of the network. Load balancing splits the traffic on equal cost routes (per flow or per packet). To support load balancing, the delays on parallel logical links need to be similar enough, so that there is no impact on an application if its traffic is rerouted on an alternate logical link after a failure.

In addition to maximizing fault resistance, other practical constraints and requirements faced by carriers today may be incorporated into a mapping solution. One of the practical constraints is maintaining the ISP's Service Level Agreements (SLA's) for any network node pair in the network. Maximum network node-to-network node delay is an important SLA parameter and its value is defined by each ISP. In the continental US, the currently maximum delay is typically between about 50 ms and 80 ms. However, the maximum delay may any specified value. The delay between any network node pair should be below the value defined in the SLA. In addition to the maximum delay, relative delay on the alternative inter-network node paths, may also be taken into consideration. Many applications cannot tolerate a major change in delay in the event of a failure. For example, a Voice-over Internet Protocol (VoIP) application would suffer dramatically if rerouted on a link that caused the end-to-end delay to currently increase by about 50 ms.

Another practical constraint is wavelength limitations. IP networks often have an almost complete absence of wavelength converters in the DWDM layers and from the diversity of fiber quality (fibers currently can support between 8 and 80 wavelengths). Therefore, a shortage of wavelengths in these IP networks is not unusual. If there is a shortage of wavelength in an IP network, the order that the network node pairs are mapped may be critical. As such, network node pairs may be prioritized. For example, logical links connecting network nodes that carry the largest amount of traffic would assure higher fault resilience than logical links carrying small amounts of traffic. On a large IP network, the priority network node pairs are often transcontinental links that connect two major cities such as New York and San Francisco.

Given a particular topology of the physical network, it is not always possible to simultaneously find completely disjoint physical links, and to maintain the delay below the SLA for all logical links between a given network node pair. For example, there may not necessarily exist two short delay paths that are also completely disjoint. In order to find completely disjoint paths, sometimes a long circuitous route for the second path that substantially increases the delay is used.

Figure 2:
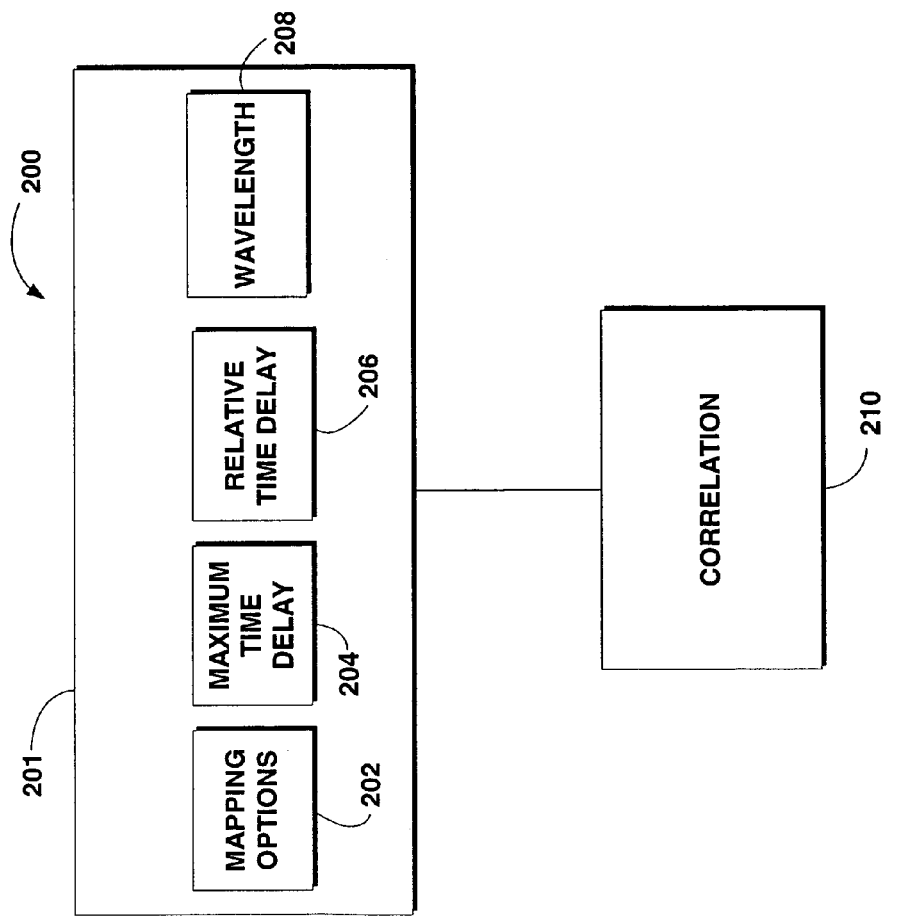
FIG. 2 is a block diagram of a computing system including a practical constraint module and a correlation module in accordance with an embodiment of the present invention.

The present invention is directed to a system and method for identifying the optimal mapping solution in a network. FIG. 2 depicts an exemplary computer system 200 for identifying the optimal mapping solution in a network. The system 200 includes a practical constraint module 201 coupled with a correlation module 210. The practical constraint module 201 includes a mapping options sub-module 202 that obtains one or more mapping options for mapping multiple logical links between one or more pairs of network nodes onto physical paths that are at least relatively disjoint. The practical constraint module, 201, also includes a maximum time delay sub-module 204 for obtaining a maximum time delay allowed between the each pair of network nodes. The practical constraint module 201 may also optionally include a relative time delay sub-module 206 and/or a wavelength sub-module 208. The relative time delay sub-module 206 obtains a relative time delay allowed between two or more physical paths. The wavelength sub-module 208 obtains the availability of wavelengths in the network. The correlation module 210 correlates the mapping options with the maximum delay and optionally correlates the mapping options with the maximum delay, the relative time delay allowed and/or the wavelength availability.

Those skilled in the art will appreciate that the present invention contemplates the presence of additional modules and/or sub-modules of the computer system 200, and the modules and/or sub-modules may be combined with one another and/or separated into new modules and/or sub-modules.

Figure 3:
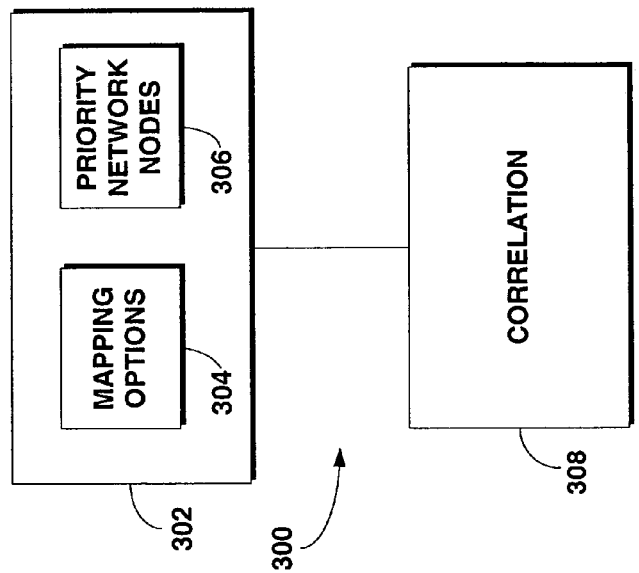
FIG. 3 is a block diagram of a computing system, including a practical constraint module and a correlation module in accordance with an embodiment of the present invention.

The present invention is directed to a system and method for identifying the optimal mapping solution in a network. FIG. 3 depicts an exemplary computer system 300 for identifying the optimal mapping solution in a network. The system 300 includes a practical constraint module 302 coupled with a correlation module 308. The practical constraint module 302 includes a mapping options sub-module 304 that obtains one or more mapping options for mapping multiple logical links between two or more pairs of network nodes onto physical paths that are at least relatively disjoint. The practical constraint module, 302, includes a priority sub-module 306 for obtaining a priority order of the network node pairs. The correlation module 308 correlates the mapping options with the network node priority.

Those skilled in the art will appreciate that the present invention contemplates the presence of additional modules and/or sub-modules of the computer system 300, and the modules and/or sub-modules may be combined with one another and/or separated into new modules and/or sub-modules.

The invention may be described in the general context of computer-executable instructions, such as program modules. Generally, program modules include routines, programs, objects, components, segments, schemas, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Computers typically include a variety of computer-readable media. Computer-readable media includes any media that can be accessed by a computer and includes both volatile and nonvolatile media, removable and non-removable media. By way of example, and not limitation, computer-readable media may comprise computer storage media and communications media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD), holographic or other optical storage, magnetic cassettes, magnetic tape, magnetic disk storage or other magnetic storage devices, or any other medium which can be used to store the desired information and which can be accessed by a computer.

Communications media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communications media includes wired media such as a wired network or direct wired connection, and wireless media such as acoustic, RF, infrared, spread spectrum and other wireless media. Communications media are commonly used to upload and download information in a network environment, such as the Internet. Combinations of any of the above should also be included within the scope of computer-readable media.

The computer may operate in a networked environment using logical connections to one or more remote computers such as a personal computer, a server, a router, a network PC, a peer device or other common network node, and typically includes many or all of the elements described above. The logical connections may include connections to a local area network (LAN), a wide area network (WAN) and/or other networks. Such networking environments are commonplace in offices, enterprise-wide computer networks, intranets and the Internet.

Computer storage mechanisms and associated media provide storage of computer-readable instructions, data structures, program modules and other data for the computer. A user may enter commands and information into the computer through input devices such as a keyboard and pointing device, commonly referred to as a mouse, trackball or touch pad. Other input devices may include a microphone, touchscreen, camera, joystick, game pad, scanner, or the like. In addition to a monitor or other type of display device, computers may also include other peripheral output devices such as speakers and printers, which may be connected through an output peripheral interface.

Although many other internal components of computers have not been discussed herein, those of ordinary skill in the art will appreciate that such components and their interconnection are well-known. Accordingly, additional details concerning the internal construction of computers need not be disclosed in connection with the present invention.

Referring next to FIG. 4, a flow diagram 400 is provided which illustrates an embodiment for identifying optimal mapping in a network in accordance with the present invention. Mapping options are obtained at block 402. The mapping options comprise mapping multiple logical links between one or more pairs of network nodes onto physical paths of the IP topology that are as diverse as possible. In other words, a mapping option is a set of physical paths to which parallel logical links between a pair of network nodes may be mapped. The maximum time delay is obtained at block 404. The maximum time delay is the maximum delay allowed between two network nodes and is often set by an SLA requirement. The mapping options are correlated with the maximum time delay at block 406. The correlation of the mapping options with the maximum time delay allowed may be used to identify the optimal mapping of parallel logical links to physical paths of an IP network.

Referring to FIG. 5, a flow diagram 500 is provided which illustrates an embodiment for identifying optimal mapping of parallel logical links to physical paths in a network in accordance with the present invention. Mapping options are obtained at block 502. The order of network node priority is obtained at block 504. The network node priority pairs are network nodes that will have their logical links mapped first. The network node pairs with the highest priority are often those that have a special status in the network, e.g., they carry more traffic or they connect major geographical locations. In block 506, the mapping options are correlated with the network node priority. The correlation of the mapping options with network node priority may be used to identify the optimal mapping of parallel logical links to physical paths of an IP network.

Network Protection and Disjointness. In order to maximize fault-resilience, parallel logical links may be mapped onto the fiber network in such a way that either a fiber conduit or an optical equipment failure does not cause all the parallel logical links between a pair of network nodes to go down simultaneously. Thus, parallel logical links are mapped onto physically disjoint fibers whenever possible.

Finding completely disjoint fiber paths for logical links is often difficult. The logical topology demands large numbers of disjoint options, however the physical topology may limit the number of options for alternate disjoint paths. There are often a limited set of conduits containing fibers in the ground and because these fibers have been layed out according to terrain constraints (mountains, bridges, etc.) and conveniences such as train tracks or pipelines. Finding maximally disjoint paths is difficult and is often challenging in the case of a current US network backbone because the multiplicity of parallel links between network nodes is not merely two, but can be as large as 12 (although is more commonly between 4 to 7). When completely disjoint paths cannot be found, the method of the present invention searches for maximally disjoint paths.

The system and method of the present invention minimizes the number of logical links that are disrupted over all possible physical failures. In other words, the system and method of the present invention minimizes the jointness of the parallel logical links between each pair of adjacent network nodes. Minimizing the jointness is equivalent to maximizing the disjointness. The following is a description of a local jointness (LJ) metric that is assigned to a pair of network nodes.

For local jointness, consider two neighboring network node s and t. The parallel links between s and t use a set of fiber segments $\{(i,j)\}$ that start at node i and terminate at node j. Each fiber segment is to be assigned one jointness value for each pair of adjacent network nodes using that segment. (Thus each fiber gets a set of values, one for each network node pair traversing it.) For a given network node pair, the fiber segment is assigned a jointness value equal to the number of parallel logical links sharing this fiber segment minus one.

Therefore, the jointness of a fiber segment used by a single link between s and t is zero. The local jointness of a network node pair (s,t) is defined as the sum of the jointness of each fiber segment $\{(i,j)\}$ used by any of its parallel logical links. A local jointness of zero for network node pair (s,t) means that all the parallel logical links between s and t use fully disjoint physical paths.

Figure 6B:
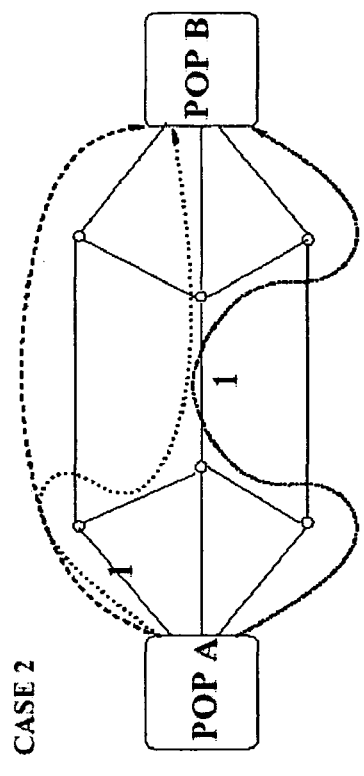
FIG. 6B is diagram of mapping logical links between two network nodes in accordance with an embodiment of the present invention.
Figure 6A:
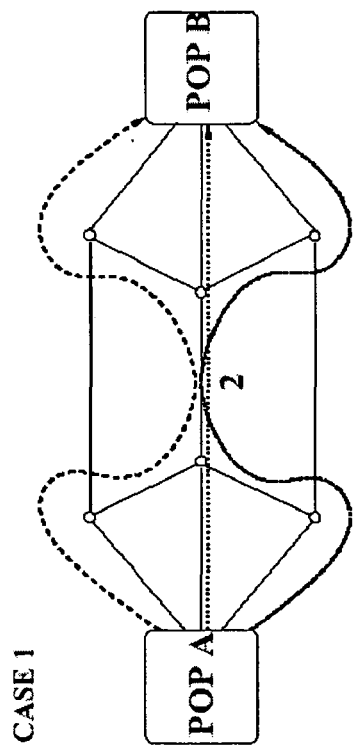
FIG. 6A is diagram of mapping logical links between two network nodes in accordance with an embodiment of the present invention.

With reference to FIG. 6A and FIG. 6B, three exemplary logical links between two network nodes are mapped onto the physical network represented in the figure. The plain lines indicate fibers separated by optical cross connects. The dashed lines represent the candidate physical paths for the three logical links. In FIG. 6A, the three parallel links share a single fiber segment and thus the jointness of network node pair (A, B) is two. In FIG. 6B, there are two fibers that each have a jointness of one (since two paths share each link), and thus the jointness of the network node pair (A, B) is also two.

The lower the jointness metric, the less fiber sharing there is. As the jointness is reduced it decreases the likelihood that a single fiber failure will affect a large number of the parallel logical links of the same network node pair. Thus, minimizing the jointness metric can improve robustness.

In the illustrated example, two different scenarios can give rise to the same jointness value for a network node pair. Therefore the jointness metric does not always distinguish the two scenarios in FIG. 6A and FIG. 6B in terms of robustness. Since different mapping scenarios can lead to the same jointness value, the jointness metric in this example does not uniquely differentiate all possible mapping scenarios. In this example, the mapping of FIG. 6B would be considered more robust than the mapping of FIG. 6A. In FIG. 6A, a single fiber failure will bring down all the logical links between network nodes A and B, whereas in FIG. 6B the two network nodes will remain connected under any single fiber failure scenario. Priority information, discussed later, may be used to add further robustness differentiation to the jointness metric.

To determine the global jointness of the network, the local jointness over all neighboring network node pairs in the backbone is added. The global jointness then can be used to compare various mappings. The impact of the delay SLAs on fiber sharing may also be evaluated using this jointness metric.

Delay constraints. A Service Level Agreement (SLA) is a contract, for example, between an ISP and its customer. This contract specifies a maximum end-to-end delay (maximum delay constraint) between any arbitrary pair or network nodes (not just neighboring network nodes) that should be satisfied at any moment in time, both under normal operation and during failures. The delay mostly comes from propagation delay. The delay between a pair of network nodes is the worse case total transmission time, among all possible routes, between these two network nodes. All the possible routes between two network nodes are considered as any one of them may be used as the alternate route in event of a failure.

The physical layout of fibers in today's networks tends to yield the following situation: two network nodes that are geographically close often have one route between them that is short (in terms of distance and hence propagation time), while all other routes are much longer (typically on the order of 5 to 10 times longer). If there are many parallel links to be mapped for a given network node pair, it makes it difficult to minimize jointness without increasing the length of alternate fiber paths. As mentioned earlier, it is not acceptable for SLAs to be broken when routes change. Furthermore, ISPs cannot allow delay sensitive applications to experience a degradation in delay that would be critical to the application. Thus, another delay constraint, the relative delay constraint, limits the allowable difference in delay between two paths is introduced.

In order to control the relative delay constraint, for each pair of neighboring network nodes, one of its paths is chosen to be the default path. The delay of each of the parallel logical links, for a given network node pair is to be no more than u % longer than the default path delay. Conceptually the default path is a reference path used to control the delay differences between alternate paths. Because the default path is an artifact of the method, it may or may not be used itself. Later, three different strategies for computing the default path will be discussed.

Wavelength limitation. In DWDM networks each fiber often has a fixed number of wavelengths. While performing the mapping, the system may determine whether a sufficient number of wavelengths exist for this mapping. In the case of no wavelength conversion, the same wavelength should be available on all the fiber segments involved in the physical paths. The limitation on the number of available wavelengths significantly complicates the problem. A solution that is optimal from a jointness standpoint might not be feasible from the wavelength allocation standpoint. In other words, assigning one wavelength to a logical link of network node pair (A, B) can reduce the possibilities of fiber path choice for network node pair (C, D), and increase the jointness for all other network node pairs. Therefore, in one embodiment of the invention, the system takes wavelength limitation into consideration in the computation of jointness.

Approach. In one embodiment of the present invention, an Integer Linear Program (ILP) model, that includes some or all of the constraints discussed above, is provided. In another embodiment, a heuristic algorithm is provided (using the Tabu Search meta heuristic methodology) to solve the mapping problem for large networks whose size makes the ILP model difficult to use. The solutions found by the heuristic algorithm may be compared with the one found by the ILP model. An objective of both the ILP model and the heuristic algorithm is to minimize the global jointness while simultaneously meeting the maximum and relative delay requirements for SLAs. However, it is difficult to find the optimal mapping for the constraints introduce because the problem is complex and the search space is large. Thus, two types of priorities may be applied to help manage the distribution of resources across network nodes, further improve robustness and limit the search space.

Sometimes the mapping of one network node pair can compromise the mapping of another. In particular, if there is a shortage of wavelengths, then the order in which network node pairs are mapped can be critical. Those network node pairs mapped first may use up some wavelengths that are then no longer available to other network node pairs. This can limit the choices of alternate paths for the latter network node pairs. A set of network node pairs are considered as priority network node pairs and map their logical links first. In this embodiment, those priority network node pairs are granted the minimum local jointness possible, even if it means that the non-priority network node pairs end up with a larger local jointness than they would receive if no priorities existed at all. Priority network node pairs correspond to the inter-network node logical links that are most important to protect because they have a special status in the network (e.g. they carry more traffic, or they connect major geographical locations). For example, in a large IP backbone, transcontinental east-west links are usually considered to be high priority network node pairs.

In one embodiment, among all the parallel links that must be mapped for a given network node pair, preferably at least two of them are completely disjoint (if possible) and these are priority logical links. Thus, in this embodiment, instead of mapping all parallel logical links for each network node pair simultaneously, if these are two logical links that can be mapped to completely disjoint paths, these are mapped first and the remaining parallel links are mapped afterwards. For the remaining parallel paths, the system searches for physical paths that minimize the local jointness for that network node pair (given the mapping of the first two paths). If there are not two completely disjoint paths, then all the links are mapped together, again trying to minimize the local jointness. With the second priority notion, the chances of each network node pair having at least two completely disjoint fiber paths is increased. This makes the network node pair more robust because no single fiber failure that can completely disconnect the network node pair. Referring again to FIG. 6A and FIG. 6B, the two priority logical links would have a jointness of zero in the mapping of FIG. 6B and a jointness of one in FIG. 6A. With this notion of priority the solution in FIG. 6B is better than the solution of FIG. 6A because the mapping FIG. 6B includes two completely disjoint paths whereas the mapping of FIG. 6A does not. Priority links thus may help to differentiate the robustness of two mappings of equal local jointness.

To integrate these priorities to minimize global jointness, the following mapping sequence may be used. The goal of the sequence is to minimize the global jointness while respecting the following sequence of steps:

Step 1. Map the priority logical links for the priority network node pairs.

Step 2. Map the remaining logical links of the priority network node pairs.

Step 3. Map the priority logical links for the remaining non-priority network node pairs.

Step 4. Map the remaining links (non-priority links of non-priority network node pairs).

In addition to jointness minimization, the system may also take into account delay constraints. First, the delay between any network node pair in the network is often bound by the maximum delay value found in the SLA (known as the maximum delay constraint). Second, the delay difference between all parallel links for any given neighboring network node pair should be within u % of the default path (known as the relative delay constraint).

The relative delay requirement appears as a constraint in the optimization formulation and in the following algorithm. Instead of adding the maximum delay constraint as an input to the objective function, the maximum delay is computed after the mapping has been performed, e.g. as an output of the solutions. The trade-off between jointness and maximum delay can be analyzed by varying the value of u in the set of constraints.

In one embodiment, the system and method of the present invention looks to three strategies in selecting the default path.

1) The Shortest Path (SP): is the default path and is the shortest physical path between a given neighboring network node pair. "Shortest" refers to the path with the shortest propagation delay.

2) Second Shortest Path (SSP): is the default path and is the second shortest path that exists between a given pair of neighboring network nodes.

3) Smallest Disjoint Path (SDP): For each pair of neighboring network nodes there are two completely disjoint paths if the constraints on relative delay and wavelength availability are temporarily removed. This is true because the min cut of the network is two. Given these two disjoint paths, the longer of the two is selected to be the default path.

These strategies can impact the network, especially the trade-off between delay and jointness. The consideration of the different strategies allows a wider diversity of path selection that helps meet a larger number of requirements simultaneously.

EXAMPLE 1

In the following example, a network node by a single router is represented. This "mega-router" has all of the inter-network node links for the whole network node attached to it. The same technique could be applied to intra-network node links as well.

In this example, a physical topology is composed of Optical Cross Connects (OXCs) interconnected by optical fibers is given. Each fiber is characterized by a limited number of wavelengths and its capacity. An IP topology made up of IP routers interconnected by IP layer logical links is also given. The purpose of this example is to find 1) maximally disjoint physical paths for the parallel logical links of all pairs of neighboring network nodes, such that they satisfy the relative delay constraint and 2) an assignment of wavelengths for each logical links. The search for disjoint paths and the wavelength assignment can be conducted in parallel because the wavelength assignment has a direct impact of the feasibility of physical paths.

The maximum delay over all network node pairs is an output of the solution (and the algorithm in the case of the heuristic). As explained in the previous section, the maximum delay can be controlled by tuning the parameter u. Therefore, the maximum delay is computed in a post computation step, after a mapping solution has been found.

In one embodiment of the present invention, an Integer Linear Program (ILP) model, is provided. In another embodiment, heuristic algorithm is provided (using the Tabu Search meta heuristic methodology) to solve the mapping problem for large networks whose size makes the ILP model difficult to use. The solutions found by the heuristic algorithm may be compared with the one found by the ILP model.

ILP Model. The mapping problem is formulated as an Integer Linear Program (ILP) whose objective is to minimize the Global Jointness of the network. First, all the default path lengths between each pair of neighboring network nodes are computed as discussed above.

1) Notation: Let $\varepsilon=\{(i,j)\}$ denote the set of fibers and $S=\{(s, t)\}$ denote the set of neighboring network node pairs. Let $n^{st}$ denote the number of inter-network nodes links between the two network nodes s and t. Let $S_{priority} \subset S$ represent the subset of the priority network node pairs.

Let $w_{ij}$ represent the number of wavelengths for fiber $(i,j)$, and $w_{max}$ the number of wavelengths available on the fiber with the most wavelengths. It is used as bound for the channel index in the constraints. Let $^{(x)}a_{ij} \in \{0, 1\}$ for all $(i,j) \in \varepsilon$ and $x \in \{1, 2, \ldots, w_{max}\}$ such that $^{(w)}a_{ij}=1$ if the wavelength x belongs to fiber $(i, j)$.

The notation pertaining to delays is as follows: Let $l_{ij} \geq 0$ be the length of the physical link $(i,j)$ for all $(i,j) \in \varepsilon$. The values are in the millisecond range. Let $d^{st}$ for all $(s,t) \in S$ be the delay between the network nodes s and t using the default path. The maximum delay difference among all parallel links between each pair of neighboring network nodes is specified via the parameter u.

2) Decision Variables: To compute the routing $$\pi_{ij}^{st}(m)$$

is defined for all $$(i, j) \in \varepsilon, (s, t) \in S, m \in \{1, 2, \ldots, n^{st}\}. \text{ Let } \pi_{ij}^{st}(m) = 1$$

if the $m^{th}$ link of the network node pair (s, t) traverses the fiber $(i, j)$.

Decision variables maybe used to handle wavelengths. Let $^{(x)}\lambda^{st}(m)$, defined for all $(s,t) \in S$, $m \in (1 \ldots n^{st})$ and $x \in n_{max}^{st}$, where $^{(x)}\lambda^{st}(m)=1$ if the $m^{th}$ logical link of (s, t) uses the wavelength x. Let $$^{(x)}\lambda_{ij}^{st}(m) \in \{0, 1\} \text{ where } ^{(x)}\lambda_{ij}^{st}(m) = 1$$

if the $m^{th}$ logical link of (s, t) traverses either the fiber $(i, j)$ or $(j, i)$ uses wavelength x.

The decision variables for handling the SLA are as follows. Let $\Lambda^{st}(m)$ be the total length of $m^{th}$ be the total length of $m^{th}$ logical link of (s, t) for all (s, t)∈S and $m \in \{1, 2, \ldots, n^{st}\}$ The length of logical link is defined by $$\Lambda^{st}(m) = \sum_{(i,j) \in \varepsilon} (\pi_{ij}^{st}(m) * l_{ij}).$$

Let $$\Lambda_{max}^{st}$$

be a length longer than the longest logical link of (s, t).

The jointness is computed in the model with two variables q and $q^1$ where q represents the jointness for all logical links and $q^1$ denotes the jointness for the two priority logical links. These two variables allow the local jointness for only two priority logical links (for all neighboring pairs) and for all logical links in the network to be analyzed separately. Let $$q_{ij}^{st} \geq \sum_{m=1}^{n^{st}} (\pi_{ij}^{st}(m) + \pi_{ji}^{st}(m)) - 1$$

for all (i, j)∈ε and (s, t)∈S. It is the number of paths of (s, t) minus one that use the fiber (i, j). Let $$q_{ij}^{\prime st} \geq \sum_{m=1}^{2} (\pi_{ij}^{st}(m) + \pi_{ji}^{st}(m)) - 1$$

for all (i, j)∈ε and (s, t)∈S. If the two paths use the fiber (i, j), $$q_{ij}^{\prime st}$$

is equal to one, otherwise it is null.

3) Constraints:

The flow continuity constraints for the physical paths of the inter-network nodes links of the pair of network nodes (s, t) are:

$$\sum_{j \in V:(i,j) \in \varepsilon} \pi_{ij}^{st}(m) - \sum_{j \in V:(j,i) \in \varepsilon} \pi_{ji}^{st}(m) = \begin{cases} 1 & \text{if } i = s \\ -1 & \text{if } i = t \\ 0 & \text{otherwise} \end{cases} \quad (1)$$

$$\forall i \in V, \forall ((s, t), m) \in S \times \{1 \ldots n^{st}\}$$

Equation (1) defines the physical path associated with each logical link.

Wavelength assignment. A $((s, t), m) \in S \times \{1 \ldots n^{st}\}$, $$\sum_{1 \leq x \leq w_{max}} {}^{(x)}\lambda^{st}(m) = 1 \quad (2)$$

Equation (2) does the wavelength with assignments for all the paths.

The following equation ensures that the physical paths use only fibers where wavelengths are available.

$$\varepsilon, \forall\, 1 \leq x \leq w_{ij},\ \forall\, ((s, t), m) \in S \times \{1 \ldots n^{st}\}, \quad (3)$$

$$\pi_{ij}^{st}(m) \leq (1 - {}^{(x)}\lambda^{st}(m)) * B + {}^{(x)}a_{ij}$$

If the $m^{th}$ path of the pair $(s, t)$ uses the wavelength x, since $(1-{}^{(x)}\lambda^{st}(m))=0$, the constraint becomes $$\pi_{ij}^{st}(m) \leq {}^{(x)}a_{ij} \cdot \pi_{ij}^{st}(m)$$

has to be null if the fiber (i, j) does not support this wavelength.

B is a big arbitrary number and its use is explained in more detail later. Equation (4) ensures that one wavelength can only be used once per fiber.

$$\sum_{(s,t)\in S}\left(\sum_{m=1}^{n^{st}} ({}^{(x)}\lambda_{ij}^{st}(m) + {}^{(x)}\lambda_{ji}^{st}(m))\right) \leq 1 \quad (4)$$

$$\forall\, (i,j) \in \varepsilon : i < j,\ \forall\, 1 \leq x \leq w_{ij}$$

For each fiber (i, j) and each wavelength x, only one $$^{(x)}\lambda_{ij}^{st}(m)\ \text{or}\ {}^{(x)}\lambda_{ij}^{st}(m)$$

can be used, for all the logical links of all the paths.

Constraints on ${}^{(x)}\lambda_{ij}^{st}(m)$.

$$\forall\, ((i, j), x) \in \varepsilon * [1 \ldots w_{ij}] : i < j,\ \forall\, ((s, t), m) \in S \times \{1 \ldots n^{st}\},$$

$$^{(x)}\lambda_{ij}^{st}(m) \geq \lambda_{ij}^{st}(m) + \pi_{ij}^{st}(m) + \pi_{ji}^{st}(m) - 1 \quad (5)$$

$$^{(x)}\lambda_{ij}^{st}(m) \leq {}^{(x)}\lambda^{st}(m) \quad (6)$$

$$^{(x)}\lambda_{ij}^{st}(m) \leq \pi_{ij}^{st}(m) + \pi_{ji}^{st}(m) \quad (7)$$

Equations (5), (6) and (7) ensure that $$^{(x)}\lambda_{ij}^{st}(m) = 1\ \text{if both}\ {}^{(x)}\lambda^{st}(m) = 1\ \text{and}$$

and 0 otherwise.

The constraint on the relative path lengths as follows.

$$\forall\, ((s, t), m) \in S \times \{1 \ldots n^{st}\},$$

$$\Lambda_{max}^{st} - \Lambda^{st}(m) \geq 0 \quad (8)$$

$$\Lambda_{max}^{st} \leq d^{st} * (1 + u) \quad (9)$$

Equation (8) forces $$\Lambda_{max}^{st}$$

to be longer than the physical paths of the pair of network nodes (s, t). The minimization process will search for solutions less than this largest value. Equation (9) requires this largest value to be within u % of the delay of the default path length for each (s, t).

4) Avoiding loops: The flow continuity constraints (1) are insufficient to guarantee that the physical paths avoid loops. To solve this problem, new constraints are proposed. The principle is to make sure that a path uses only fibers that are part of a subset of the physical topology called a covering tree.

5) Objective function: The objective function is to minimize:

$$B^3 * \sum_{(i,j)\in\varepsilon}\sum_{(s,t)\in S_{priority}} q'^{st}_{ij} + B^2 * \sum_{(i,j)\in\varepsilon}\sum_{(s,t)\in S_{priority}} q^{st}_{ij} + \quad (10)$$

$$B * \sum_{(i,j)\in\varepsilon}\sum_{(s,t)\in S} q'^{st}_{ij} + \sum_{(i,j)\in\varepsilon}\sum_{(s,t)\in S} q^{st}_{ij}$$

The four components of the objective function correspond to the four steps outlined in the mapping sequence discussed above. B is a large number that needs to be much larger than the sum of all the jointness parameters. In this objective, the jointness of the links included in step 1 of our mapping sequence is multiplied by $B^3$, step 2 is multiplied by $B^2$ and so on. By multiplying the first term by $B^3$, the first term of the objective function is minimized first. Thus, step 1 (step 2) has the highest importance (second highest importance) within this objective function, respectively. Whenever there is a tie (i.e., two solutions produce the same jointness for term one), then the following term is used to break the tie. The rest of the objective function is structured the same way.

EXAMPLE 2

The heuristic of this example uses the application of the Tabu Search (TS) methodology. See F. Glover, E. Taillard and D. DeWerra "A User's Guide to Tabu Search," *Annals of Operations Research*, Vol. 41, pp. 3-28, 1993. TS is based on a guided partial exploration of the space of admissible solutions. In this example, the exploration starts from an initial solution that is generally obtained with a greedy algorithm. Each solution visited is evaluated using the same objective function, equation (1), as in the ILP example. When a stop criterion is satisfied, the algorithm returns the best-visited solution.

For each admissible solution, a set of neighboring solutions is defined. A neighboring solution is defined as a solution that can be obtained from the current solution by applying a transformation (also called a move) to one aspect of the solution. The set of all admissible moves uniquely defines the neighborhood of each solution.

At each iteration of the TS algorithm, all solutions in the neighborhood of the current one are evaluated, and the best is selected as the new current solution. In order to efficiently explore the solution space, the definition of neighborhood may change during the solution space exploration; in this way it is possible to achieve an intensification or a diversification of the search in different solution regions.

A special rule, the Tabu list, is introduced in order to prevent the algorithm to deterministically cycle among already visited solutions. The Tabu list stores the last accepted moves; while a move is stored in the Tabu list, it cannot be used to generate a new move. The choice of the Tabu list size is important in the optimization procedure: too small could cause the cyclic repetition of the same solutions, while too large would severely limit the number of applicable moves, thus preventing a good exploration of the solution space.

During the search of an optimal solution, the Tabu search is allowed to investigate solutions outside the space of admissible solutions. Non-admissible solutions are solutions that require more wavelengths on some fibers than provided by the wavelength-division multiplexing (WDM) topology. All solutions, even non-admissible ones, always satisfy the SLA requirements. For some scenarios (when a fiber has only a few wavelengths) even finding a single admissible solution can be hard because of the wavelength assignment problem. To avoid getting stuck, the heuristic is allowed to temporarily go outside the space of admissible solutions. A strategic oscillation is operated between the space of admissible solutions and the space of non-admissible solutions. When inside the space of admissible solutions, current solution is improved; when outside this space, a special kind of move as described below is applied to come back instead.

The following are the seven components of the TS heuristic designed to solve the mapping problem.

Precomputation step. Before running the TS heuristic, the default length path is computed for each pair of neighboring network nodes according to the three strategies described above. For each pair of neighboring network nodes, the set of physical paths are built to satisfy the relative delay constraint. This set is then sorted according to the length of each physical link, from shortest to longest. The IP routes are built for all arbitrary network node pairs according to the ISIS routing protocol.

Initial solution. The choice of the initial solution is important since it can significantly reduce the convergence time. For each logical link, the shortest physical path between neighboring network nodes was chosen to be the initial mapping. Typically, this solution is outside the space of admissible solutions, but it is optimal in terms of delay.

Moves and Neighborhood generation. Since during the exploration admissible and non-admissible solutions were visited two different kinds of moves are defined. When the search is focused on the space of admissible solutions, the selected move will find a solution without considering the wavelength constraint. When the search takes place outside the space of admissible solutions the move will try to minimize the number of logical links that share fibers on which there is a shortage of wavelengths.

Admissible Space. Given a currently admissible solution, the next solution is generated according to the following three steps: i) randomly select an adjacent network node pair, ii) randomly select one of the pair's parallel links not present in the Tabu List, and iii) change the physical path of this link by picking a new path satisfying the maximum length constraint. All other physical paths associated with all the other logical links during past moves are not changed.

Non-Admissible Space. If the current solution does not meet the wavelength constraints, a special move is applied to force the solution to become admissible by looking at the fibers on which the shortage of wavelengths was experienced. The new solution is built as follows: i) randomly select a fiber experiencing a shortage of wavelengths, ii) randomly select a logical link that uses this fiber, and iii) change the physical path of this link to a set of fibers that does not experience wavelength shortage. All other physical paths associated with all the other logical links during past moves are not changed.

A new solution is consequently built by applying one of the moves defined above to a random subset of all the physical paths chosen from the previous step. The cardinality of this subset defines the size of the neighborhood investigated by TS.

Wavelength Assignment Problem (WAP). The WAP is NP-complete. Since this problem must be solved for each solution visited during the exploration, a heuristic that is simple enough to reach a good trade-off between running time and quality of the solution is needed. The principle of the algorithm is to assign the wavelength with the smallest channel index available, each time a new physical path is mapped.

Tabu List. A Static Tabu list is used and the most recent moves made are stored. A move is not allowed to be re-selected while on the list.

Diversification. If there are no improvements of the solution after a given number of iterations (in this example, 100), then a diversification strategy is employed. A unique perturbation is carried out by i) selecting randomly a neighboring network node pair and ii) changing all the physical paths of its parallel logical links. The selection of the paths is a random process. After having applied this perturbation, the traditional move defined previously is applied.

Stop criterion. The search procedure is stopped after a fixed number of iterations is reached. The number of iterations is defined based on the size of the network studied and a good trade-off between computational time and quality of the solution. In this example, setting this parameter to about 3500 is sufficient for a large network.

Validation. The performance of the heuristic is compared with that of the ILP model. The heuristic works has been demonstrated to work well for medium size networks, and this can be applied to large networks. A medium size topology is defined as the maximum size topology that can be solved with the ILP model. In this example, a physical topology with 15 nodes and 23 fibers that is a simplified version of the large backbone. Random logical topologies are generated by 6 to 8 network nodes and 6 to 10 neighboring network node pairs with 2 to 4 parallel logical links. For each of these exemplary topologies, several simulations with different numbers of wavelengths on the fibers were run. On average, after about 1,000 iterations of the heuristic, the results for the global jointness differed by less than about 3%.

EXAMPLE 3

Figure 7:
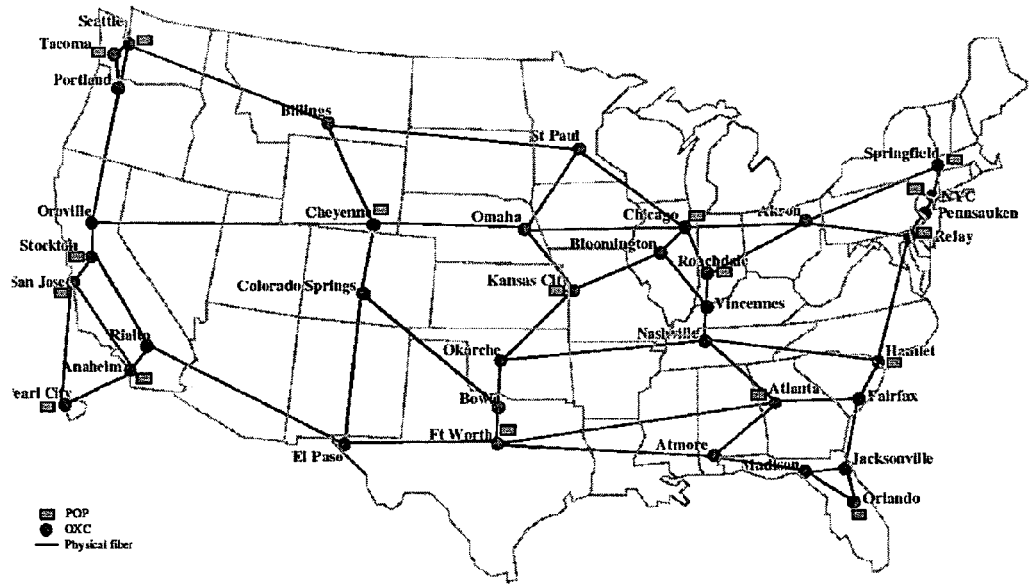
FIG. 7 is a diagram of an exemplary physical topology for a large IP network.
Figure 8:
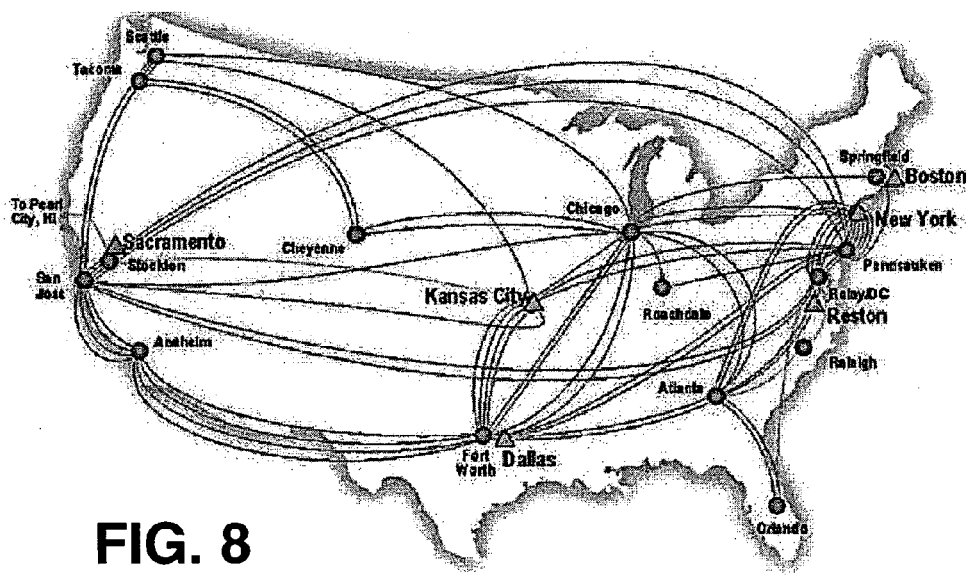
FIG. 8 is a diagram of exemplary logical topology for a large IP network.

In the following example, the TS heuristic algorithm was used to map the logical topology onto the physical topology of a large US continental IP backbone. Simplified views of the physical topology and of the IP topology are shown respectively in FIG. 7 and FIG. 8. In this example, the WDM layer is composed by 51 OXC and 77 DWDM fibers that have between 16 to 48 channels. The delay associated with each fiber was proportional to its length and equal to the transmission time at the speed of light on an optical fiber. In the illustrated example, the logical topology consists of approximately 101 logical links and 17 network nodes, with 35 neighboring network node pairs. Each exemplary neighboring network node pair had a minimum of two parallel logical links, a maximum of six and an average of three. There were six priority network node pairs (indexed by the numbers 6, 9, 13, 15, 33, and 34 in the plots further below) and a total of 136 arbitrary network node pairs, each of whose IP routes were between one and four hops long in this example.

With reference to FIGS. 9A-D, four metrics were used to evaluate this approach. The first two used were the Global Jointness (GJ) and the Local Jointness (LJ) as described earlier. The last two metrics used were the maximum delay and the network node-to-network node delay, described earlier.

Jointness and maximum delay. Performance metrics are plotted in FIGS. 9A-D. The terms SP, SSP and SDP refer to the default path computation strategies described earlier. The suffix -2 means that the jointness was computed for the priority parallel logical links only. (Two priority links per pair of adjacent network nodes were used). The suffix -ALL is used when the jointness is computed on all logical links.

Figure 9A:
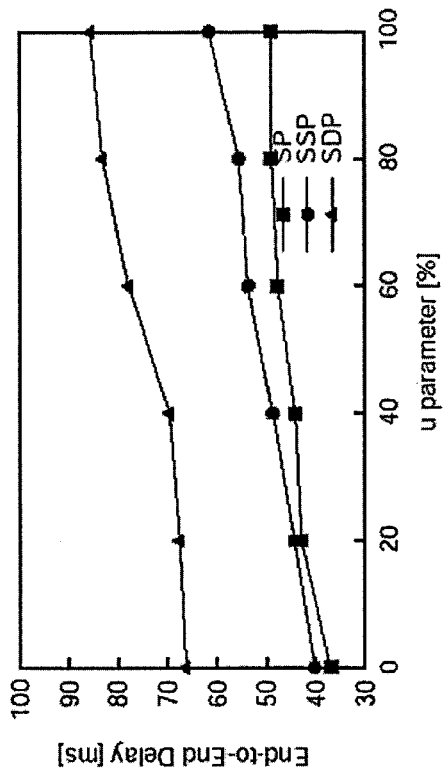
FIG. 9A is graphical representation of a performance metric in accordance with an embodiment of the present invention.

FIG. 9A is an exemplary illustration of the trade-off between the jointness and the relative delay expressed by u. The example illustrates how the global jointness decreases as the relative delay increases. Larger values of u allowed for larger sets of acceptable paths, which in turn made it easier to find disjoint paths. When u was restricted to be small, then the set of candidate paths meeting the relative delay requirement was small and this limited choices in trying to find paths that do not overlap. All curves flattened out when u reaches 40%, leading to similar jointness. Thus, if paths were allowed to have a difference in delay of 40%, then the relative delay constraint was sufficiently loose so that it no longer has any impact on the jointness of paths. For all except one strategy (SDP-2), the jointness was significant for u below 20%. In the illustrated example, the minimum achievable jointness in a large backbone given the current physical topology was approximately 50.

In the illustrated example, the choice of the default path had a great impact on the jointness of the solution. The shortest path (SP) strategy produced the largest amount of jointness. In the illustrated example, it was observed on network topology that there was only a single short physical path between two network nodes, and all alternative paths were longer. In the illustrated example, the large jointness of the SP strategy was explained as follows: If there was only one short path while all others were rather long, and the relative delay constraint u was small, then the algorithm had to pick two long paths to satisfy the u requirement. Since this leads to two long paths, they were less likely to be disjoint.

In the illustrated example, the SDP strategy yielded the minimal amount of jointness. SDP-2 exhibited a global jointness of zero for any value of u. In the illustrated example, using the SDP strategy located completely disjoint paths for the two priority links of all network node pairs. In this example, the same plot shows a physically disjoint physical path for all logical links in the large backbone could not be found, whatever the value of u.

Figure 9B:
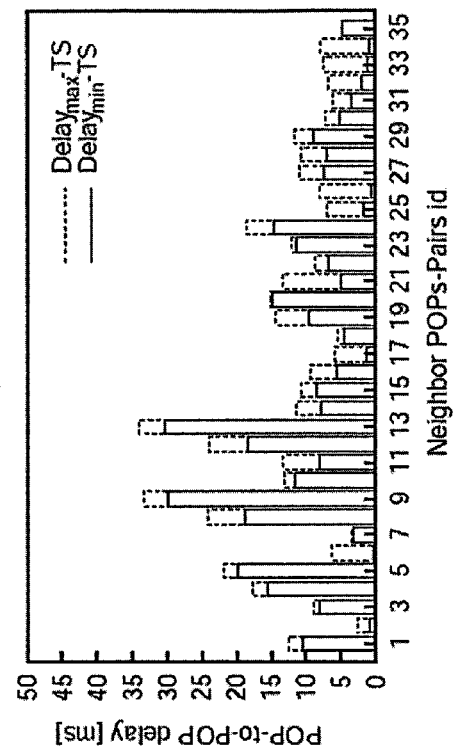
FIG. 9B is graphical representation of a performance metric in accordance with an embodiment of the present invention.

In the illustrated example, these strategies were analyzed in terms of the maximum delay they yield. FIG. 9B is an exemplary graph of the maximum delay as a function of u for each of the three strategies. The maximum delays increased as the relative delay u increased. In the illustrated example, the SP strategy was the worst in terms of jointness but performed the best in terms of maximum delay. Similarly, the SDP strategy was the best in terms of jointness but performed the worst in terms of maximum delay. In the illustrated example, a tradeoff between jointness and maximum delay was illustrated. Moreover, in this example, the SDP strategy was the only strategy that provided totally disjoint solutions for at least 2 logical links per network node pair (an SDP-2 jointness of zero) but it failed to meet the SLA requirement (for SLAs below 60 or 70 ms—depending upon u). In the illustrated example, if a large ISP wanted to have two disjoint logical links between each adjacent network node pair, they would have to set their SLA as high as 65 ms. (Note that u did not matter here as the jointness was zero for any value of u for the SDP-2 strategy).

The analysis of a large network in this example illustrated that if the ISP wants to set their SLAs as low as 50 ms, then they may have to accept some path overlap among priority links. In the illustrated example, with an SLA of 50 ms, the optimal strategy was SSP that had a global jointness of roughly ten for the priority links (i.e., GJ for SSP-2).

Figure 9C:
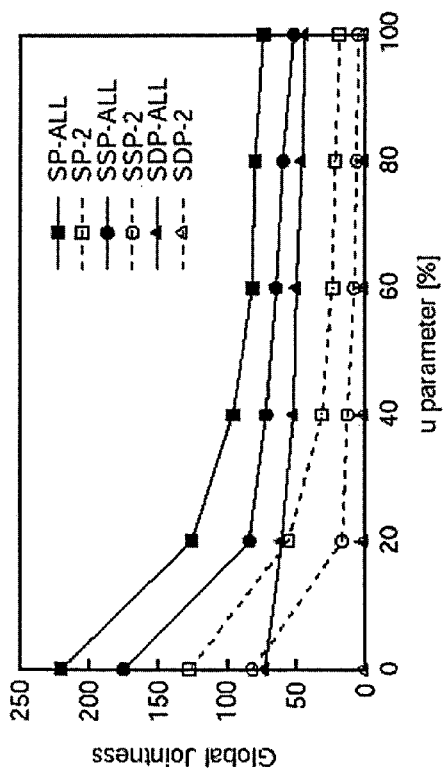
FIG. 9C is graphical representation of a performance metric in accordance with an embodiment of the present invention.
Figure 9D:
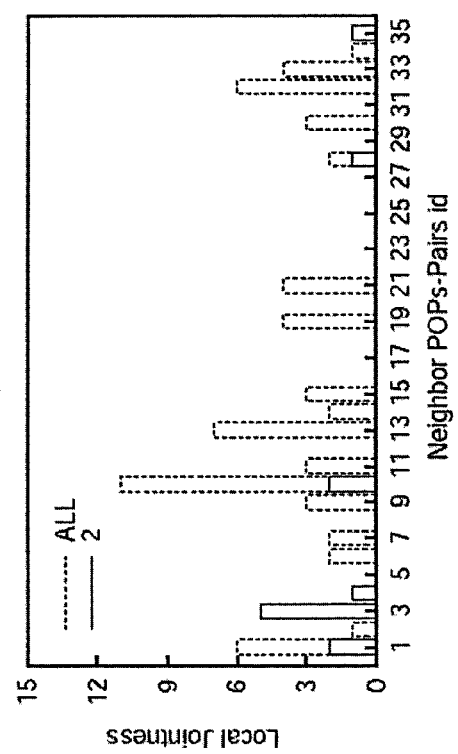
FIG. 9D is graphical representation of a performance metric in accordance with an embodiment of the present invention.

In FIG. 9C and FIG. 9D, the SSP strategy and u=50% were used. The value of u corresponded to a maximum delay of 50 ms and to a global jointness for the priority links of priority network nodes that was fairly close to zero for the SSP strategy. (In the figure, the value of GJ=14 for priority links of priority network nodes and GJ=71 for all logical links in the whole network). FIG. 9C is an exemplary illustration of the local jointness achieved for each neighboring network node pair. In this example, only six of those network node pairs could not find two completely disjoint physical paths. On the other hand, thirteen network node pairs had completely disjoint paths for all their parallel logical links. The priority network node pairs were not among these thirteen network node pairs; however these priority network node pairs had at least two disjoint parallel logical links (LJ-2=0). In this example, logical links between all priority network node pairs with a SLA of 50 ms were not fully protected.

FIG. 9D is an exemplary illustration of the delay experienced by the longest and the shortest logical links among all parallel logical links for each adjacent network node pair. In this example, the difference between the maximum and the minimum delay corresponded to the relative delay parameter. For most pairs, the relative delay was small. The maximum relative delay in this example was about 7 ms. Despite the SDP strategy, the maximum relative delay was observed for short physical links. In this example, network node pairs that were geographically far experienced a small relative delay, in the order of about 3 ms.

EXAMPLE 4

In this example, the impact of having a priority for network node pairs was illustrated. First, a mapping was performed according to the sequence described earlier that includes all the priorities. A second mapping in which the notion of priority network node pairs was dropped (while still retaining the notion of priority links). The second mapping dropped the first two terms while retaining the latter two. For both of these scenarios the resulting jointness was calculated on four sets of logical links: the priority links of the priority network node pairs, all links of the priority network node pairs, priority links of all network node pairs, and all links among all network node pairs. (The jointness of a few logical links was calculated by summing the jointness value of each fiber segment belong to those logical links. Similarly, the jointness of a subset of the network node pairs was calculated by summing the jointness for those network node pairs included in the subset.) Even if the priority network node pairs were not included in the second mapping, the resulting jointness for those network nodes could be calculated. This shows what happens to those particular network nodes when their priority was removed. Again, the SSP default path was used with a relative delay requirement of u=50%. Table I illustrates the global jointness for the four sets of links under both mapping scenarios.

TABLE I

|  | Priority links of priority network nodes | All links of priority network nodes | Priority links of all network nodes | All links of all network nodes |
| --- | --- | --- | --- | --- |
| Mapping with priority network nodes | 0 | 20 | 33 | 103 |
| Mapping without priority network nodes | 2 | 25 | 30 | 108 |

As already seen, with network node priorities complete disjointness for all the parallel links of the priority network nodes was not always guaranteed (case GJ=20). However, complete disjointness for the priority links of the priority network nodes could be achieved (case GJ=0). If the priority of these special network node pairs was removed, then it was no longer guaranteed that all the priority network node pairs were completely robust. In this case, at least one network node pair and possibly two did not achieve complete robustness.

By eliminating network node priorities, the overall jointness measures on all links increased (from about 20 to 25 for priority network nodes, and from about 103 to 108 when measured over all network nodes). All of the four sets of links did better in terms of jointness with priority network nodes except one group, namely the priority links of non-priority network nodes. Those links had better jointness without network node priorities. Thus, the tradeoff in having network node pair priorities was that the three of the link groups did better with priorities while one group did worse. In the illustrated example, the cost of having priorities was about a 10% increase (GJ goes from 30 to 33) in the jointness of this group of logical links. This example illustrates how the priority mechanism manages the global set of network resources across all logical links.

EXAMPLE 5

The mapping algorithm in this example was used to analyze where new fibers or new wavelengths should be added to increase the robustness of the IP topology.

Figure 10:
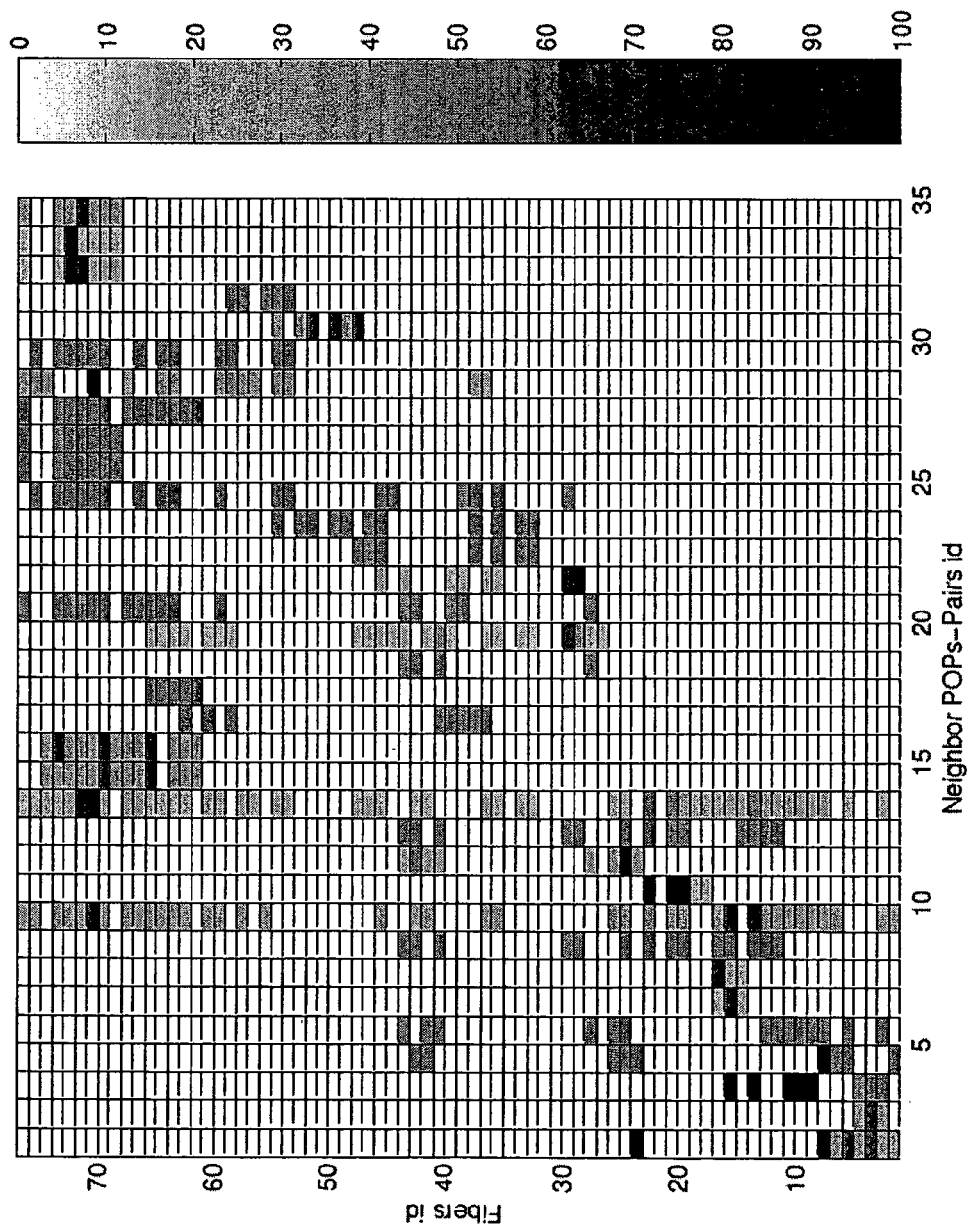
FIG. 10 is exemplary graphical representation of the amount of logical links that use a given fiber segment.

With reference to FIG. 10, a grey scale is used to indicate, for each adjacent network node pair, the fraction of logical links that use a given fiber segment. A black square means that 100% of the parallel logical links use the fiber segment. A white square means the network node pair does not use that fiber segment at all.

Ten out of the seventy-seven fibers may cause a pair of adjacent network nodes to completely lose connectivity in case of failure. From the logical link standpoint, five out of thirty-five network node pairs may lose connectivity because of a single fiber segment failure. Note that none of the priority network node pairs were concerned. The rest of the network was well protected since in 66% of the fiber cuts, none of the other network node pairs would lose more than 50% of their parallel logical links.

Using this visualization, a carrier could quickly identify the high-risk fiber segments whose failure could bring down the entire direct connectivity between a pair of network nodes. (The network node pair would have to communicate via another intermediate network node in such an event.) The identity of the network node pairs subject that may be completely disconnected from a single fiber segment can also be readily found from this visualization. For example, network node pair number three can lose all its parallel logical links from the failure of any one of five of its fiber segments; similarly network node pair eleven can lose all of its logical links from the failure of any one of two of its fibers. By chance, these seven high-risk fibers were not the same and these two network node pairs were not located in the same geographical area.

Viewing this from the physical topology side, the failure of fiber segment seven may disconnect two network node pairs. (Similarly for fiber segment 72) The locations of these two fiber segments can thus be considered as high risk, or critical, areas in the US where large problems can occur. Adding fibers in these areas (along similar closeby routes) may increase the disjointness without paying a large price in terms of delay.

The optimal mapping was computed using the tool after having added two fiber segments to the physical topology in order to improve the robustness around fiber segments 7 and 72. With these fiber additions the number of fiber cuts that would completely disconnect adjacent network node pairs was reduced from ten to four. The number of adjacent network node pair impacted by these fiber cut was reduced from five to three. In this example, the addition of a few new fibers in well-chosen locations can substantially improve the protection of the logical topology while still meeting the SLA.

It is often more cost effective to improve network robustness by upgrading existing fibers via additional wavelengths than by deploying new fibers in the ground. To know where it was most useful to upgrade fiber segments, the wavelength availability constraint was disabled before running the mapping algorithm. By comparing this visualization graph of the mapping with and without WAP, those black boxes that turn to lighter shades of gray when WAP was removed can be identified. In this example, those boxes identify the fibers segments that should be upgraded. In a large network backbone, the general jointness for the priority links can be decreased by about 66% (from 33 to 12), and the jointness all the paths by more than about 25% (from 103 to 71) by upgrading only 6 fiber segments in the country (with an average of 5 wavelengths each). This illustrated that a small shortage of wavelengths had a huge influence on the robustness of the exemplary network.

As can be seen, the present invention and its equivalents are well-adapted to provide a system and method for identifying optimal mapping of logical links to the physical topology of a network, including Internet Protocol Networks. Many different arrangements of the various components depicted, as well as components not shown, are possible without departing from the spirit and scope of the present invention.

The present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of this invention. A skilled programmer may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need to be carried out in the specific order described.

We claim:

1. A method for identifying optimal mapping of logical links to the physical topology of a network, the method comprising:

obtaining one or more mapping options for mapping multiple logical links between a first pair of network nodes and a second pair of network nodes, the first and second pair of network nodes sharing at least one node, onto physical paths that are at least relatively disjoint to enhance robustness of the network in an event of a resource failure;

obtaining a maximum time delay allowed between each pair of network nodes; and correlating the mapping options with the maximum time delay to identify optimal mapping of logical links to the physical topology of a network.

2. The method of claim 1, further comprising:
obtaining a relative time delay allowed between two or more physical paths.

3. The method of claim 2, further comprising:
correlating the mapping options with the maximum time delay and the relative time delay to identify optimal mapping of logical links to the physical topology of a network.

4. The method of claim 3, further comprising:
obtaining the availability of wavelengths in a network.

5. The method of claim 4, further comprising:
correlating the mapping options with the maximum time delay, the relative time delay and the wavelength availability to identify optimal mapping of logical links to the physical topology of a network.

6. The method of claim 5, further comprising:
obtaining a priority order of the network node pairs.

7. The method of claim 6, further comprising:
correlating the mapping options with the maximum time delay, the relative time delay, the wavelength availability and the priority order of the network node pairs to identify optimal mapping of logical links to the physical topology of a network.

8. The method of claim 7, wherein the correlation is performed using an integer linear program.

9. The method of claim 7, wherein the correlation is performed using a Tabu search methodology.

10. The method of claim 7, wherein the correlation is performed to identify the optimal mapping for a large Internet network backbone.

11. The method of claim 7, wherein the correlation is utilized to identify where new fibers or wavelengths need to be added to the network topology.

12. One or more computer storage media having computer-executable instructions for performing the method recited in claim 1.

13. One or more computer storage media having computer-executable instructions for performing the method recited in claim 7.

14. A computer system for identifying optimal mapping of logical links onto the physical topology of a network, the system comprising:
a practical constraint module comprising a mapping option sub-module for obtaining one or more mapping options for multiple logical links between one or more pairs of network nodes onto physical paths that are at least relatively disjoint and a maximum time delay sub-module for obtaining a maximum time delay allowed between the each pair of network nodes; and
a correlation module coupled with the practical constraint module for correlating the mapping options with the maximum time delay to identify optimal mapping of logical links to the physical topology of a network.

15. The computer system of claim 14, wherein the practical constraint module further comprises a relative time delay sub-module for obtaining the relative time delay allowed between two or more physical paths.

16. The computer system of claim 15, wherein the correlation module coupled with the practical constraint module correlates the mapping options with the maximum time delay and the relative time delay.

17. The computer system of claim 16, wherein the practical constraint module further comprises a wavelength sub-module for obtaining the wavelength availability in a network.

18. The computer system of claim 17, wherein the correlation module coupled with the practical constraint module correlates the mapping options with the maximum time delay, the relative time delay allowed and wavelength availability.

19. The computer system of claim 18, wherein the correlation module utilizes an integer linear program to perform the correlation.

20. The computer system of claim 18, wherein the correlation module utilizes a Tabu search methodology to perform the correlation.

21. The computer system of claim 18, wherein the correlation is performed to identify the optimal mapping for a large Internet network backbone.

22. A system for identifying optimal mapping of logical links to the physical topology of a network, the system comprising:
means for obtaining one or more mapping options for mapping multiple logical links between one or more pairs of network nodes onto physical paths that are at least relatively disjoint;
means for obtaining a maximum time delay allowed between the each pair of network nodes; and
means for correlating the mapping options with the maximum time delay to identify optimal mapping of logical links to the physical topology of a network.

23. The system of claim 22, further comprising:
means for obtaining a relative time delay allowed between two or more physical paths.

24. The system of claim 23, further comprising:
means for correlating the mapping options with the maximum time delay and the relative time delay to identify optimal mapping of logical links to the physical topology of a network.

25. The system of claim 24, further comprising:
means for obtaining the availability of wavelengths in the network.

26. The system of claim 25, further comprising:
means for correlating the mapping options with the maximum time delay, the relative time delay and the wavelength availability to identify optimal mapping of logical links to the physical topology of a network.

27. The system of claim 26, further comprising:
means for obtaining a priority order of the network node pairs.

28. The system of claim 27, further comprising:
means for correlating the mapping options with the maximum time delay, the relative time delay, the wavelength availability and the priority order of the network node pairs to identify optimal mapping of logical links to the physical topology of a network.

* * * * *